United States Patent Office
3,222,313
Patented Dec. 7, 1965

3,222,313
VINYL HALIDE RESIN COMPOSITIONS PLASTI-
CIZED WITH KETAL-ESTER COMPOUNDS
James E. Horan, Chicago, Ill., and Richard E. Van Strien,
Griffith, Ind., assignors to Standard Oil Company,
Chicago, Ill., a corporation of Indiana
No Drawing. Original application Nov. 29, 1961, Ser.
No. 155,833. Divided and this application June 30,
1964, Ser. No. 384,819
4 Claims. (Cl. 260—31.8)

This is a division of application Serial No. 155,833, filed November 29, 1961.

This invention relates to novel ketal-ester compounds and to resin compositions containing plasticized thermoplastic materials, and more particularly to novel ketal-ester compounds of benzophenone polycarboxylic acid and to vinyl resin compositions comprising polymers of vinyl chloride and co-polymers thereof, plasticized with the novel ketal-ester compounds.

Resin compositions containing thermoplastic materials such as polymers of vinyl chloride and co-polymers thereof, and plasticizers such as the esters of phthalic acid are known and have been used in the coating, packaging and plastics industries.

In many applications such as coatings for textile and paper products, the resin compositions are required to have good elongation and tensile strength properties. These properties are imparted to the resin compositions by the use of suitable plasticizers in the compositions. In the past, not all plasticizers have satisfactorily imparted both of these properties to the resin compositions.

It has been discovered that a novel ketal-ester of benzophenone polycarboxylic acid can be used as a plasticizer for a vinyl chloride polymer to produce a vinyl resin composition. It has been further discovered that this vinyl resin composition exhibits good elongation and tensile strength properties. One example of a ketal-ester compound of this invention is 1,1-di-(4-n-butyl-benzene carboxylate)-1,1-di-n-butoxy methane.

The novel ketal-ester compound or ketal-ester of benzophenone polycarboxylic acid which can be used as a plasticizer in a vinyl resin composition has the formula:

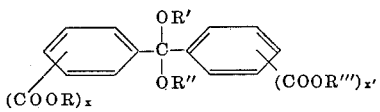

where R, R', R", and R'" are each selected from the group consisting of alkyl radicals having from 1 to about 12 carbon atoms, cycloalkyl radicals having from 3 to about 10 carbon atoms, aralkyl radicals having from 7 to about 12 carbon atoms and mixtures of these radicals. It is preferred that R, R', R" and R'" are each alkyl radicals having from 1 to about 12 carbon atoms. Examples of the alkyl radicals are methyl, butyl, isohexyl, octyl, isooctyl and dodecyl radicals; of the cycloalkyl radicals are cyclopropyl, cyclohexyl, bicyclohexyl and bicyclodecyl radicals; and of the aralkyl radicals are benzyl, tolylethyl, phenylhexyl, and naphthylethyl radicals. The described mixtures are combination radicals of the alkyl, cycloalkyl and aralkyl radicals and for example are methylcyclopropyl, cyclopropylpropyl, ethylcyclobutyl, dimethyl, bicyclohexyl and benzylcyclopropyl radicals.

The (—COOR)$_x$ and (—COOR''')$_{x'}$ groups are attached to the phenyl radicals of the novel ketal-ester compounds and $x$ and $x'$ are each an integer from 0 to 5 and preferably from 1 to 3. The sum of $x+x'$ is equal to at least 1. Examples of novel ketal-ester compounds of this invention are the ketal-esters of the following acids: 1-benzophenone monocarboxylic acid, 2,4'-benzophenone dicarboxylic acid, 4,4'-benzophenone dicarboxylic acid, 4,4'-benzophenone dicarboxylic acid, 3,3',4,4'-benzophenone tetracarboxylic acid and 2,2',3,3',4,4',5,5',6,6' - benzophenone decacarboxylic acid. It is to be understood that the ketal-esters of these acids have R, R', R", R'" radicals as herein described.

Other substituents such as ether, nitro and halogen groups may be present in the R, R', R", and R'" radicals and may be attached to the positions of the phenyl radicals which do not have carboxyl groups.

The ketal-ester compounds of this invention are prepared by methods known in this art. Typically, this is accomplished by reacting the ester of benzophenone polycarboxylic acid with an organic sulfite having the formula $(R_1O)_2SO$ in the presence of an acid catalyst. Usually an alcohol is also present. Suitable sulfites are dimethyl sulfite, dibutyl sulfite, dioctyl sulfite, dicyclohexyl sulfite, and diphenylpropyl sulfite. If not readily available these and other organic sulfites can be prepared from the alcohol and $SOCl_2$ by methods known in this art.

Generally, it is preferred that the $R_1$ groups in the sulfite contain the same or more carbon atoms than the number contained in the alcohol and that the reaction be carried out in an excess of the sulfite.

The catalyst is generally an inorganic acid. Suitable catalysts are essentially anhydrous hydrogen chloride and sulfuric acid.

The temperature at which the reaction is carried out is about 24° C., although higher temperatures may be employed to increase the rate of reaction.

The novel ketal-ester compounds of this invention can be used as plasticizers in vinyl resin compositions. Vinyl resin compositions are known in this art and in general contain polymers and interpolymers of compounds containing a vinylidene group ($CH_2=CH<$) such as vinyl chloride, vinyl acetate and vinylidene chloride; and may contain varying amounts of other synthetic and natural resins, for example the cellulose derivatives such as cellulose nitrate, cellulose acetate, cellulose acetobutyrate, ethyl cellulose, benzyl cellulose and the like, together with plasticizers, stabilizers, fillers and pigments.

The ketal-ester compounds are particularly valuable as plasticizers in vinyl resin compositions which comprise a vinyl chloride polymer selected from the group consisting of polyvinyl chloride and co-polymers of at least 70% vinyl chloride with up to 30% of other monomers containing a vinylidene group co-polymerizable therewith in the molecule, plasticized with a ketal-ester compound of this invention, for example, 1,1-di-(4-n-butyl benzene carboxylate)-1,1-di-n-butoxy methane. Examples of this vinylidene group are vinylidene chloride, vinylacetate and other vinyl esters of monocarboxylic acids, esters of maleic and fumaric acid such as ethylmaleate and ethylfumarate and the like.

The vinyl resin compositions of this invention may be in the form of solid molding materials, pastes, lacquers, solutions or dispersions. In the preparation of compositions comprising plasticized vinyl chloride resins, the ketal-ester compound may be blended with the resin in a conventional manner, for example, by mixing and heating on a roll mill, Banbury type mixers or other suitable mixing devices, at a temperature from about 120° C. to about 160° C. and preferably about 150° C.

The relative amounts of the ketal-ester compound and the vinyl chloride resin may be varied over wide limits according to the particular properties required, with the ketal-ester compound being present in an amount sufficient to improve the elongation and tensile strength properties of the vinyl resin composition. Amounts similar to those conventionally used with other plasticizers are employed, the proportions of the ketal-ester compound being usually in the range of from about 10% to about 75% by weight of the vinyl resin composition. Generally, compositions containing from about 30 to about 60 parts by weight of the ketal-ester compound per 100 parts by weight of the vinyl chloride resin have been found to have highly desirable properties.

The ketal-ester compounds of this invention may be employed as the sole plasticizer in resin compositions or may be used in admixture with other known plasticizers such as dibutylphthalate, di-2-ethylhexylphthalate, diisooctylphthalate, and the like and similar esters of, for example, adipic acid, phosphoric acid, sebacic acid, etc. may replace a portion of the ketal-ester compound, the total amount of plasticizer employed being within the range previously indicated. Secondary plasticizers or extenders having lesser compatibility with vinyl resins, for example butyl stearate, high boiling hydrocarbon oils, chlorinated paraffin waxes and the like may be advantageously employed in admixture with the plasticizer of this invention to obtain compositions having particular desirable physical properties.

In addition to the vinyl chloride polymer and plasticizer, other ingredients may be present in the compositions of the present invention, for example, stabilizers, fillers, pigments, and the like which are conventionally employed in preparing vinyl resin compositions for particular applications.

Vinyl resin compositions of this invention are suitable for applications usual for previously known vinyl resin compositions including for example, molding, extrusion and coating applications. Plastisols, that is, dispersions of finely divided polyvinyl chloride polymers or co-polymers in the plasticizer may be prepared and used in known manner for the production of hollow articles, film, coatings and the like.

The following examples illustrate a novel ketal-ester compound and a vinyl resin composition of this invention.

EXAMPLE I

One illustrative ketal of this invention was prepared by mixing 100 ml. of n-butyl alcohol, 25 ml. of di-n-butyl sulfite and 7.0 gm. (0.02 mole) of di-n-butyl 4,4'-benzophenone dicarboxylate in a 200 ml., 4 neck, round bottom flask fitted with a stirrer, thermometer, condenser and gas sparger. The temperature was about 24° C. Dry HCl was bubbled into the reaction mixture for 3 hours and the mixture was stirred for an additional 18 hours. The contents of the reactor were poured into 30 ml. of 10% NaOH (by weight) and the resulting mixture was extracted with hexane. The hexane solution was then extracted with water. The hexane solution was then distilled with hexane being first removed overhead and then the unreacted butyl sulfite. The remaining product showed complete conversion to the ketal as the infrared spectra showed no keto band and a positive ketal band. The yield of the ketal was 9.1 gas. or 94%.

The ketal was further analyzed and had a boiling point of 260° C. at 0.4 mm of Hg, a density at 75° C. of 1.02, and a pour point of −15° C. The calculated analysis was 72.6% C, 8.59% H, 18.8% O and a saponification number of 219 and the observed analysis was 72.7% C, 8.41% H, 18.9% O and a saponification number of 221. The ketal product was 1,1-di-(4-n-butyl benzene carboxylate)-1,1-di-n-butoxy methane.

EXAMPLE II

One illustrative vinyl resin composition of this invention was prepared by blending 55 parts by weight of the ketal prepared in Example I with 100 parts by weight of a polyvinyl chloride resin having the following general properties: Specific gravity, 1.40; maximum ash content, 0.1%; maximum moisture, 0.7%; and specific viscosity, 0.52–58; and obtained from the B. F. Goodrich Chemical Company under the name Geon 101. The blends were then milled on a steam-heated two-roll mill at about 149° C. until a uniform fused product was obtained. The plasticized product had the following properties which are listed together with those of a known plasticizer, diisooctylphthalate at the same concentration.

*Table I*

[(A) PVC resin plasticized with novel ketal-ester of Example I. (B) PVC resin plasticized with diisooctylphthalate]

| | A | B |
|---|---|---|
| Bend brittle temperature, °C | −15 | −26 |
| Ultimate tensile strength, p.s.i | 3,000 | 2,740 |
| Modulus, 100% elongation, p.s.i | 2,050 | 1,790 |
| Ultimate elongation, percent | 320 | 280 |

As can be seen from Table I, the ketal-ester compound compares very favorably as a plasticizer to the diisooctylphthalate.

Thus having described the invention, what is claimed is:

1. A vinyl resin composition which comprises a vinyl chloride polymer selected from the group consisting of polyvinyl chloride and co-polymers of at least 70% vinyl chloride with up to 30% of other monomer containing a vinylidene group co-polymerizable therewith in the polymer molecule, plasticized with a ketal-ester compound having the formula:

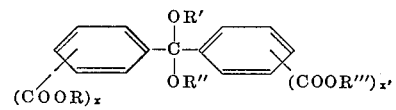

where R, R', R" and R"' are each selected from the group consisting of alkyl radicals having from 1 to about 12 carbon atoms, cycloalkyl radicals having from 3 to about 10 carbon atoms, and aralkyl radicals having from 7 to about 12 carbon atoms, $x$ and $x'$ are each an integer from 0 to 5, and $x+x'$ is equal to at least 1, said ketal-ester compound being present in an amount sufficient to improve the elongation and tensile properties of said composition.

2. The composition of claim 1 wherein said ketal-ester compound is present in an amount from about 10% to about 75% by weight of said composition.

3. The composition of claim 1 wherein said $x$ and $x'$ are each an integer from 1 to 3.

4. The composition of claim 1 wherein said ketal-ester compound is 1,1-di-(4-n-butyl-benzene carboxylate)-1,1-di-n-butoxy methane.

References Cited by the Examiner

UNITED STATES PATENTS 2,147,242  2/1939  Conover _____ 260—31.8
2,806,059  9/1957  Bruson et al. _____ 260—517
2,848,486  8/1958  Petropoulos _____ 260—31.8

MORRIS LIEBMAN, *Primary Examiner.*